United States Patent [19]

Berner

[11] Patent Number: 4,511,596

[45] Date of Patent: Apr. 16, 1985

[54] PROCESS FOR THE ELECTRON BEAM CURING OF COATING COMPOSITIONS

[75] Inventor: Godwin Berner, Rheinfelden, Switzerland

[73] Assignee: Ciba-Geigy Corporation, Ardsley, N.Y.

[21] Appl. No.: 571,166

[22] Filed: Jan. 16, 1984

[30] Foreign Application Priority Data

Jan. 20, 1983 [CH] Switzerland ............... 319/83

[51] Int. Cl.$^3$ .............................. B05D 3/06
[52] U.S. Cl. ................... 427/44; 204/159.23; 427/54.1
[58] Field of Search ............... 427/44, 54.1; 204/159.23

[56] References Cited

U.S. PATENT DOCUMENTS

| | | | |
|---|---|---|---|
| 3,619,392 | 11/1971 | Metzner et al. | 427/44 |
| 3,699,022 | 10/1972 | Behrens et al. | 204/159.15 |
| 3,767,547 | 10/1973 | Puhk | 204/159.23 |
| 3,901,779 | 8/1975 | Mani | 427/44 |
| 4,129,667 | 12/1978 | Lorenz et al. | 427/44 |
| 4,279,720 | 7/1981 | Berner | 204/159.23 |
| 4,301,209 | 11/1981 | Lorenz et al. | 428/339 |
| 4,382,102 | 5/1983 | Noomen | 204/159.23 |
| 4,393,094 | 7/1983 | Garrett et al. | 427/44 |

*Primary Examiner*—John H. Newsome
*Attorney, Agent, or Firm*—Harry Falber

[57] ABSTRACT

The electron beam curing of ethylenically unsaturated coating compositions can be accelerated by the addition of sterically hindered amines. These amines are at the same time light stabilizers for the cured coating. 2,2,6,6-Tetraalkylpiperidine derivatives are examples of such amines. If a UV absorber is added to the coating compositions in addition, a synergistic increase in the light-stabilizing effect occurs.

8 Claims, No Drawings

PROCESS FOR THE ELECTRON BEAM CURING OF COATING COMPOSITIONS

The invention relates to a process for curing ethylenically unsaturated coating compositions by electron beam irradiation with the addition of sterically hindered amines as curing accelerators, and to the coating compositions curable in this way.

The curing of finishes, printing inks, graphic products, printed circuits and other coating compositions by electron beam curing is gaining increasing importance in industrial production, where a large number of items is to be cured within a short time. If a further shortening of the curing times in electron beam curing, which per se are very short, is accomplished, the economics of this curing process can be substantially improved, in spite of the high costs of the irradiation equipment, and a lower radiation dose can be applied.

Hitherto, no accelerators for electron beam curing have been disclosed. It has now been found that the curing of ethylenically unsaturated coating compositions can be substantially accelerated by an addition of sterically hindered amines. In contrast to other amines, this does not cause any significant yellowing of the coating compositions or premature gelling on storage. A further advantage is the known fact that the sterically hindered amines generally possess a light-stabilising action. After curing, these compounds thus act as light stabilisers for the coating compositions.

The subject of the invention is therefore a process for curing coating compositions, which contain ethylenically unsaturated compounds, by electron beam irradiation with the addition of a curing accelerator, which process comprises using at least one compound from the class of sterically hindered amines as the curing accelerator.

The coating composition can consist of an individual radiation-curable compound, for example an acrylate or methacrylate of a polyol. Preferably, however, mixtures of at least one low-molecular and one higher-molecular radiation-curable compound are used. Examples of low-molecular compounds are (meth)acrylates of monools, diols, triols or tetraols, for example methyl, ethyl, butyl, 2-ethylhexyl, 2-hydroxyethyl or 2-hydroxypropyl acrylate, isobornyl acrylate, methyl, ethyl or isopropyl methacrylate, dicyclopentadienyl (meth)acrylate, dicyclopentadienyloxyethyl (meth)acrylate, ethylene glycol, propylene glycol, hexamethylene glycol di(meth)acrylate, bisphenol-A diacrylate, trimethylolpropane triacrylate, tris-(2-acryloxyethyl)isocyanurate and pentaerythritol triacrylate or tetra(meth)acrylate. Further low-molecular monomers are acrylonitrile, acrylamide, methacrylamide, N-substituted (meth)acrylamides, vinyl acetate, vinyl acrylate, vinyl alkyl ethers, N-vinylpyrrolidone, vinyl chloride, vinylidene chloride, styrene, alkyl- or halogenostyrenes, divinylbenzene, divinyl succinate, diallyl phthalate, triallyl isocyanurate or triallyl phosphate.

Examples of higher-molecular (oligomeric) radiation-curable compounds are acrylated or methacrylated epoxide resins, polyurethanes, polyethers or polyesters, unsaturated polyester resins, oligomers of alkyl (meth)acrylates or corresponding co-oligomers. Such oligomers are also called prepolymers. Their molecular weight can range from about 400 to 4,000, and the number of double bonds per molecule can be 1 up to about 20.

The viscosity of the mixtures and the properties of the cured coatings can be varied by appropriate mixing of low-molecular components with higher-molecular components. In general, the mixtures are solvent-free, but in certain cases the addition of a small amount of solvent may be necessary for setting the correct viscosity. To increase the viscosity, it is also possible to dissolve limited amounts of a polymer in the mixture.

The coating composition can also be a mixture of ethylenically unsaturated, radiation-curable binders and thermally or catalytically-thermally curable binders. Such a hybrid system can be cured in two stages; for example, precuring can be effected by electron irradiation and final curing can be effected by supplying heat; for certain applications, this can have advantages. As the catalysts for the thermal curing, preferably masked (capped) acid curing agents can be used here, which are ineffective in normal storage and are converted into the active form only by the supply of heat.

The coatings can be transparent or pigmented, and they can also contain conventional additives, for example flow assistants, thixotropic agents or wetting agents. For special applications, the coating compositions can also have been mixed with fillers or reinforcing agents. Examples of fillers are kaolin, talc, gypsum or silicate-type fillers. Examples of reinforcing agents are in particular fibres, for example glass fibres, metal fibres or carbon fibres.

Further possible additives are stabilisers, for example antioxidants, metal deactivators or light stabilisers. Of particular importance is the addition of light stabilisers of the UV absorber type and of organic compounds of trivalent phosphorus, for example of phosphites, phosphonites or phosphines.

The curing accelerators, used according to the invention, from the class of sterically hindered amines are compounds which are known as light stabilisers. Preferably, these are cyclic amines, in particular derivatives of 5-membered, 6-membered or 7-membered heterocyclic ring systems with 1 or 2N atoms which ring systems have tertiary C atoms in both ortho-positions relative to the N atom, whereby steric hindrance of the N atom is effected.

Examples of such ring systems are the 2,2,5,5-tetrasubstituted pyrrolidines, imidazolidones and oxazolidines of the formulae

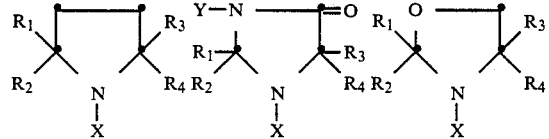

or the 2,2,6,6-tetrasubstituted piperazinones piperazinediones and hexahydropyrimidines of the formulae

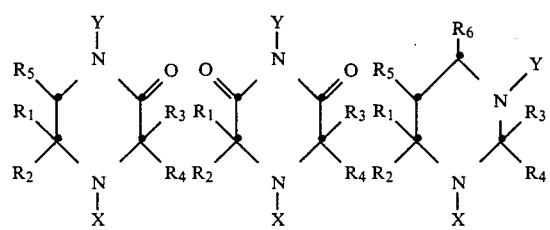

or the diazacycloheptanones of the formula

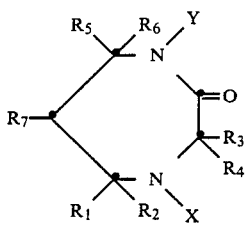

in which $R_1$, $R_2$, $R_3$ and $R_4$ are aliphatic hydrocarbon radicals which may be linked to form spiro rings, $R_5$, $R_6$ and $R_7$ are hydrogen or alkyl, and X and Y are hydrogen, oxide oxygen, OH or a monovalent organic radical. Decahydroquinolines disubstituted in the 2-position are also representatives of sterically hindered amines.

Compounds of particular importance from amongst the sterically hindered amines are the 2,2,6,6-tetraalkylpiperidine derivatives. These are compounds which, in their molecule, contain at least one group of the formula I

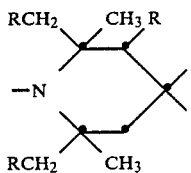

in which R is hydrogen or methyl. The curing accelerators can contain one or more such groups of the formula I, and these can, for example, be a mono-, bis-, tris-, tetra- or oligo-piperidine compound. Those piperidine derivatives are preferred which contain a group of the formula I in which R is hydrogen, and those in which there is no hydrogen atom on the ring nitrogen.

Most of these piperidine light stabilisers carry polar substituents in the 4-position of the piperidine ring, or carry a spiro ring in this position.

Of particular importance are the following classes of piperidine compounds.

(a) Compounds of the formula II

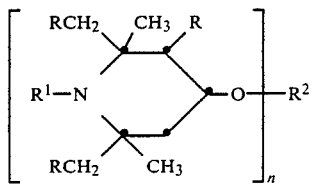

in which n is a number from 1 to 4, preferably 1 or 2, R is hydrogen or methyl, $R^1$ is hydrogen, O, —OH, —O—$C_1$-$C_8$-alkanoyl, $C_1$-$C_{18}$-alkyl, —$CH_2CN$, $C_3$-$C_8$-alkenyl, $C_3$-$C_8$-alkynyl, $C_7$-$C_{12}$-aralkyl, $C_1$-$C_8$-alkanoyl, $C_3$-$C_5$-alkenoyl, glycidyl or a group —$CH_2$—CH(OH)—Z, in which Z is hydrogen, methyl or phenyl, $R^1$ preferably being $C_1$-$C_{12}$-alkyl, allyl, benzyl, acetyl or acryloyl and $R^2$, if n=1, being hydrogen, $C_1$-$C_{18}$-alkyl which may be interrupted by one or more oxygen atoms, cyanoethyl, benzyl, glycidyl, a monovalent radical of an aliphatic, cycloaliphatic, araliphatic or aromatic carboxylic acid, carbamic acid or phosphorus-containing containing acid or a monovalent silyl radical, preferably a radical of an aliphatic carboxylic acid having 2 to 18 C atoms, a cycloaliphatic carboxylic acid having 7 to 15 C atoms or an aromatic carboxylic acid having 7 to 15 C atoms, or, if n=2, $R^2$ is $C_1$-$C_{12}$-alkylene, $C_4$-$C_{12}$-alkenylene, xylylene, a divalent radical of an aliphatic, cycloaliphatic, araliphatic or aromatic dicarboxylic acid, dicarbamic acid or phosphorus-containing acid or a divalent silyl radical, preferably a radical of an aliphatic dicarboxylic acid having 2 to 36 C atoms, a cycloaliphatic or aromatic dicarboxylic acid having 8 to 14 C atoms or an aliphatic, cycloaliphatic or aromatic dicarbamic acid having 8 to 14 C atoms, or, if n=3, $R^2$ is a trivalent radical of an aliphatic, cycloaliphatic or aromatic tricarboxylic acid, an aromatic tricarbamic acid or a phosphorus-containing acid or a trivalent silyl radical, or, if n=4, $R^2$ is a tetravalent radical of an aliphatic, cycloaliphatic or aromatic tetracarboxylic acid.

Any $C_1$-$C_{12}$-alkyl substituents are, for example, methyl, ethyl, n-propyl, n-butyl, sec.-butyl, tert.-butyl, n-hexyl, n-octyl, 2-ethylhexyl, n-nonyl, n-decyl, n-undecyl or n-dodecyl.

$C_1$-$C_{18}$-Alkyl $R^1$ or $R^2$ can be, for example, one of the groups listed above and additionally also, for example, n-tridecyl, n-tetradecyl, n-hexadecyl or n-octadecyl.

$C_3$-$C_8$-Alkenyl $R^1$ can, for example, be prop-1-enyl, allyl, methallyl, but-2-enyl, pent-2-enyl, hex-2-enyl, oct-2-enyl and 4-tert.-butyl-but-2-enyl.

$C_3$-$C_8$-Alkynyl $R^1$ is preferably propargyl.

$C_7$-$C_{12}$-Aralkyl $R^1$ is in particular phenethyl or especially benzyl.

$C_1$-$C_8$-Alkanoyl $R^1$ is, for example, formyl, propionyl, butyryl, octanoyl and preferably acetyl, and $C_3$-$C_5$-alkenoyl $R^1$ is especially acryloyl.

A monovalent carboxylic acid radical $R^2$ is, for example, an acetic acid, stearic acid, salicyclic acid, methacrylic acid, benzoic acid or $\beta$-(3,5-di-tert.-butyl-4-hydroxyphenyl)-propionic acid radical.

A divalent dicarboxylic acid radical $R^2$ is, for example, an adipic acid, suberic acid, sebacic acid, maleic acid, phthalic acid, dibutylmalonic acid, dibenzylmalonic acid, butyl-(3,5-di-tert.-butyl-4-hydroxybenzyl)-malonic acid or bicycloheptenedicarboxylic acid radical.

A trivalent tricarboxylic acid radical $R^2$ is, for example, a trimellitic acid or a nitrilotriacetic acid radical.

A tetravalent tetracarboxylic acid radical $R^2$ is, for example, the tetravalent radical of butane-1,2,3,4-tetracarboxylic acid or of pyromellitic acid.

A divalent dicarbamic acid radical $R^2$ is, for example, a hexamethylenedicarbamic acid or a 2,4-toluenedicarbamic acid radical.

The following compounds ae examples of piperidine compounds from this class:
(1) 4-hydroxy-2,2,6,6-tetramethylpiperidine
(2) 1-allyl-4-hydroxy-2,2,6,6-tetramethylpiperidine
(3) 1-benzyl-4-hydroxy-2,2,6,6-tetramethylpiperidine
(4) 1-(4-tert.-butyl-but-2-enyl)-4-hydroxy-2,2,6,6-tetramethylpiperidine
(5) 4-stearoyloxy-2,2,6,6-tetramethylpiperidine
(6) 1-ethyl-4-salicyloyloxy-2,2,6,6-tetramethylpiperidine
(7) 4-methacryloyloxy-1,2,2,6,6-pentamethylpiperidine
(8) 1,2,2,6,6-pentamethylpiperidin-4-yl-$\beta$-(3,5-di-tert.-butyl-4-hydroxyphenyl)propionate
(9) di-(1-benzyl-2,2,6,6-tetramethylpiperidin-4-yl)maleate

(10) di-(2,2,6,6-tetramethylpiperidin-4-yl)adipate
(11) di-(2,2,6,6-tetramethylpiperidin-4-yl)sebacate
(12) di-(1,2,3,6-tetramethyl-2,6-diethylpiperidin-4-yl)sebacate
(13) di-(1-allyl-2,2,6,6-tetramethylpiperidin-4-yl)phthalate
(14) 1-propargyl-4-β-cyanoethoxy-2,2,6,6-tetramethylpiperidine
(15) 1-acetyl-2,2,6,6-tetramethylpiperidin-4-yl acetate
(16) tri-(2,2,6,6-tetramethylpiperidin-4-yl)trimellitate
(17) 1-acryloyl-4-benzyloxy-2,2,6,6-tetramethylpiperidine
(18) di-(1,2,2,6,6-pentamethylpiperidin-4-yl)dibutylmalonate
(19) di-(1,2,2,6,6-pentamethylpiperidin-4-yl)butyl-(3,5-di-tert.-butyl-4-hydroxybenzyl)-malonate
(20) di-(1,2,2,6,6-pentamethylpiperidin-4-yl)dibenzylmalonate
(21) di-(1,2,3,6-tetramethyl-2,6-diethylpiperidin-4-yl)dibenzyl-malonate
(22) hexane-1',6'-bis-(4-carbamoyloxy-1-n-butyl-2,2,6,6-tetramethylpiperidine)
(23) toluene-2',4'-bis-(4-carbamoyloxy-1-n-propyl-2,2,6,6-tetramethylpiperidine)
(24) dimethyl-bis-(2,2,6,6-tetramethylpiperidin-4-oxy)-silane
(25) phenyl-tris-(2,2,6,6-tetramethylpiperidin-4-oxy)-silane
(26) tris-(1-propyl-2,2,6,6-tetramethylpiperidin-4-yl)phosphite
(27) tris-(1-propyl-2,2,6,6-tetramethylpiperidin-4-yl)phosphate
(28) phenyl [bis-(1,2,2,6,6-pentamethylpiperidin-4-yl)]phosphonate
(29) di-(1,2,2,6,6-pentamethylpiperidin-4-yl)sebacate (b) Compounds of the formula (III)

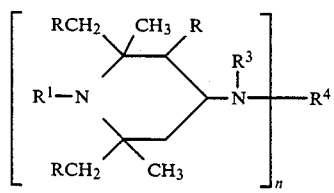

in which n is the number 1 or 2, R and $R^1$ are as defined under (a), $R^3$ is hydrogen, $C_1$–$C_{12}$-alkyl, $C_2$–$C_5$-hydroxyalkyl, $C_5$–$C_7$-cycloalkyl, $C_7$–$C_8$-aralkyl, $C_2$–$C_{18}$-alkanoyl, $C_3$–$C_5$-alkenoyl or benzoyl and $R^4$, if n=1, is hydrogen, $C_1$–$C_{18}$-alkyl, $C_3$–$C_8$-alkenyl, $C_5$–$C_7$-cycloalkyl, $C_1$–$C_4$-alkyl substituted by a hydroxyl, cyano, alkoxycarbonyl or carbamide group, glycidyl, a group of the formula —$CH_2$—CH(OH)—Z or of the formula —CONH—Z, in which Z is hydrogen, methyl or phenyl, or, if n=2, $R^4$ is $C_2$–$C_{12}$-alkylene, $C_6$–$C_{12}$-arylene, xylylene, a —$CH_2$—CH(OH)—$CH_2$— group or a group —$CH_2$—CH(OH)—$CH_2$—O—D—O—$CH_2$—CH(OH)—$CH_2$—, in which D is $C_2$–$C_{10}$-alkylene, $C_6$–$C_{15}$-arylene, $C_6$–$C_{12}$-cycloalkylene or, provided that $R^3$ is not alkanoyl, alkenoyl or benzoyl, $R^4$ can also be a divalent radical of an aliphatic, cycloaliphatic or aromatic dicarboxylic acid or dicarbamic acid or also the group —CO—, or, if n=1, $R^3$ and $R^4$ together can be the divalent radical of an aliphatic, cycloaliphatic or aromatic 1,2- or 1,3-dicarboxylic acid.

Any $C_1$–$C_{12}$- or $C_1$–$C_{18}$-alkyl substituents are as already defined under (a).

Any $C_5$–$C_7$-cycloalkyl substituents are especially cyclohexyl.

$C_7$–$C_8$-Aralkyl $R^3$ is in particular phenylethyl or especially benzyl.

$C_2$–$C_{18}$-Alkanoyl $R^3$ is, for example, propionyl, butyryl, octanoyl, dodecanoyl, hexadecanoyl, octadecanoyl or preferably acetyl, and $C_3$–$C_5$-alkenoyl $R^3$ is especially acryloyl.

$C_2$–$C_8$-Alkenyl $R^4$ is, for example, allyl, methallyl, but-2-enyl, pent-2-enyl, hex-2-enyl or oct-2-enyl.

$C_2$–$C_4$-Alkyl $R^4$, which is substituted by a hydroxyl, cyano, alkoxycarbonyl or carbamide group, can be, for example, 2-hydroxyethyl, 2-hydroxypropyl, 2-cyanoethyl, methoxycarbonylmethyl, 2-ethoxy-carbonylethyl, 2-aminocarbonylpropyl or 2-(dimethylaminocarbonyl)-ethyl.

Any $C_2$–$C_{12}$-alkylene substituents are, for example, ethylene, propylene, 2,2-dimethylpropylene, tetramethylene, hexamethylene, octamethylene, decamethylene or dodecamethylene.

Any $C_6$–$C_{15}$-arylene substituents are, for example, o-, m- or p-phenylene, 1,4-naphthylene or 4,4'-diphenylene.

$C_6$–$C_{12}$-Alkylene D is especially cyclohexylene.

The following compounds are examples of piperidine compounds from this class:

(30) N,N'-bis-(2,2,6,6-tetramethylpiperidin-4-yl)-hexamethylene-1,6-diamine
(31) N,N'-bis-(2,2,6,6-tetramethylpiperidin-4-yl)-hexamethylene-1,6-diacetamide
(32) 1-acetyl-4-(N-cyclohexylacetamido)-2,2,6,6-tetramethylpiperidine
(33) 4-benzylamino-2,2,6,6-tetramethylpiperidine
(34) N,N'-bis-(2,2,6,6-tetramethylpiperidin-4-yl)-N,N'-dibutyladipamide
(35) N,N'-bis-(2,2,6,6-tetramethylpiperidin-4-yl)-N,N'-dicyclohexyl-2-hydroxypropylene-1,3-diamine
(36) N,N'-bis-(2,2,6,6-tetramethylpiperidin-4-yl)-p-xylylenediamine
(37) the compound of the formula

(38) 4-(bis-2-hydroxyethyl-amino)-1,2,2,6,6-pentamethylpiperidine
(39) 4-(3-methyl-4-hydroxy-5-tert.-butyl-benzamido)-2,2,6,6-tetramethylpiperidine
(40) 4-methacrylamido-1,2,2,6,6-pentamethylpiperidine (c) Compounds of the formula (IV)

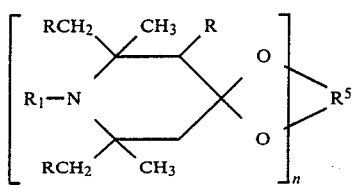

in which n is the number 1 or 2, R and $R^1$ are as defined under (a) and $R^5$, if n=1, is $C_2$–$C_8$-alkylene or -hydroxyalkylene or $C_4$–$C_{22}$-acyloxyalkylene and, if n=2, is the group (—$CH_2$)$_2$C($CH_2$—)$_2$.

$C_2$–$C_8$-Alkylene or -hydroxyalkylene $R^5$ is, for example, ethylene, 1-methyl-ethylene, propylene, 2-ethylpropylene or 2-ethyl-2-hydroxymethylpropylene.

$C_4$–$C_{22}$-Acyloxyalkylene $R^5$ is, for example, 2-ethyl-2-acetoxymethylpropylene.

The following compounds are examples of piperidine compounds from this class:

(41) 9-aza-8,8,10,10-tetramethyl-1,5-dioxaspiro[5.5]undecane
(42) 9-aza-8,8,10,10-tetramethyl-3-ethyl-1,5-dioxaspiro[5.5]undecane
(43) 8-aza-2,7,7,8,9,9-hexamethyl-1,4-dioxaspiro[4.5]decane
(44) 9-aza-3-hydroxymethyl-3-ethyl-8,8,9,10,10-pentamethyl-1,5-dioxaspiro[5.5]undecane
(45) 9-aza-3-ethyl-3-acetoxymethyl-9-acetyl-8,8,10,10-tetramethyl-1,5-dioxaspiro[5.5]undecane
(46) 2,2,6,6-tetramethylpiperidine-4-spiro-2'-(1',3'-dioxane)-5'-spiro-5''-(1'',3''-dioxane)-2''-spiro-4'''-(2''',2''',6''',6'''-tetramethylpiperidine).

(d) Compounds of the formulae VA, VB and VC

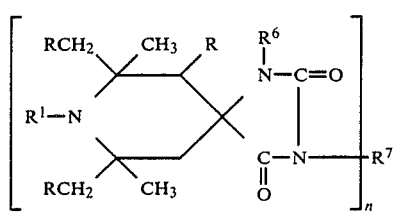

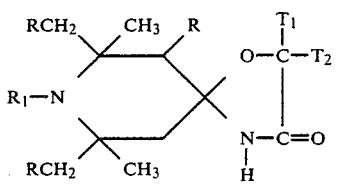

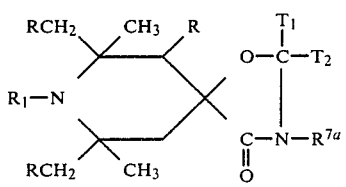

in which n is the number 1 or 2, R and $R^1$ are as defined under (a), $R^6$ is hydrogen, $C_1$–$C_{12}$-alkyl, allyl, benzyl, glycidyl or $C_2$–$C_6$-alkoxyalkyl, $R^7$, if n=1 is hydrogen, $C_1$–$C_{12}$-alkyl, $C_3$–$C_5$-alkenyl, $C_7$–$C_9$-aralkyl, $C_5$–$C_7$-cycloalkyl, $C_2$–$C_4$-hydroxyalkyl, $C_2$–$C_6$-alkoxyalkyl, $C_6$–$C_{10}$-aryl, glycidyl or a group of the formula —($CH_2$)$_p$—COO—Q or of the formula —($CH_2$)$_p$—O—CO—Q, in which p is 1 or 2 and Q is $C_1$–$C_4$-alkyl or phenyl, and, if n=2, $R^7$ is $C_2$–$C_{12}$-alkylene, $C_6$–$C_{12}$-arylene, a group —$CH_2$—CH(OH)—$CH_2$—O—D—O—$CH_2$—CH(OH)—$CH_2$—, in which D is $C_2$–$C_{10}$-alkylene, $C_6$–$C_{15}$-arylene, $C_6$–$C_{12}$-cycloalkylene or a group —$CH_2$CH(OZ')$CH_2$—(O$CH_2$—CH(OZ')$CH_2$)$_2$— in which Z' is hydrogen, $C_1$–$C_{18}$-alkyl, allyl, benzyl, $C_2$–$C_{12}$-alkanoyl or benzoyl, $R^{7a}$ is hydrogen, $C_1$–$C_{12}$-alkyl, $C_3$–$C_5$-alkenyl, $C_7$–$C_9$-aralkyl, $C_5$–$C_7$-cycloalkyl, $C_2$–$C_4$-hydroxyalkyl, $C_2$–$C_6$-alkoxyalkyl, glycidyl, $C_2$–$C_{12}$-alkanoyl, $C_7$–$C_{11}$-aroyl or a group —$CH_2$—COOQ', —$CH_2CH_2$—COOQ' or —$CH_2CH(CH_3)$—COOQ', in which Q' is $C_1$–$C_{20}$-alkyl, $C_3$–$C_{14}$-alkoxyalkyl, $C_5$–$C_7$-cycloalkyl or phenyl, and $T_1$ and $T_2$ independently of one another are hydrogen, $C_1$–$C_{18}$-alkyl or $C_6$–$C_{10}$-aryl or $C_7$–$C_9$-aralkyl which are unsubstituted or substituted by halogen or $C_1$–$C_4$-alkyl, or $T_1$ and $T_2$, together with the C atom linking them, form a $C_5$–$C_{12}$-cycloalkane ring.

Any $C_1$–$C_{12}$-alkyl substituents are, for example, methyl, ethyl, n-propyl, n-butyl, sec.-butyl, tert.-butyl, n-hexyl, n-octyl, 2-ethylhexyl, n-nonyl, n-decyl, n-undecyl or n-dodecyl.

Any $C_1$–$C_{18}$-alkyl substituents can, for example, be the groups listed above and in addition also, for example, n-tridecyl, n-tetradecyl, n-hexadecyl or n-octadecyl.

Any $C_2$–$C_6$-alkoxyalkyl substituents are, for example, methoxymethyl, ethoxymethyl, propoxymethyl, tert.-butoxymethyl, ethoxyethyl, ethoxypropyl, n-butoxyethyl, tert.-butoxyethyl, isopropoxyethyl or propoxypropyl.

Alkenyl $R^7$ or $R^{7a}$ is, for example, prop-1-enyl, allyl, methallyl, but-2-enyl or pent-2-enyl.

$C_7$–$C_9$-Aralkyl $R^7$, $R^{7a}$, $T_1$ and $T_2$ is in particular phenethyl or especially benzyl. If $T_1$ and $T_2$, together with the C atom, form a cycloalkane ring, this can be, for example, a cyclopentane, cyclohexane, cyclooctane or cyclododecane ring.

$C_2$–$C_4$-Hydroxyalkyl $R^7$ or $R^{7a}$ is, for example, 2-hydroxyethyl, 2-hydroxypropyl, 2-hydroxybutyl or 4-hydroxybutyl.

$C_6$–$C_{10}$-Aryl $R^7$, $T_1$ and $T_2$ is in particular phenyl, α-naphthyl or β-naphthyl, which are unsubstituted or substituted by halogen or $C_1$–$C_4$-alkyl.

$C_2$–$C_{12}$-Alkylene $R^7$ is, for example, ethylene, propylene, 2,2-dimethylpropylene, tetramethylene, hexamethylene, octamethylene, decamethylene or dodecamethylene.

$C_4$–$C_{12}$-Alkenylene $R^7$ is in particular but-2-enylene, pent-2-enylene or hex-3-enylene.

$C_6$–$C_{12}$-Arylene $R^7$ is, for example, o-, m- or p-phenylene, 1,4-naphthylene or 4,4'-diphenylene.

$C_2$–$C_{12}$-Alkanoyl $R^{7a}$ or Z' is, for example, propionyl, butyryl, octanoyl, dodecanoyl or preferably acetyl. Aroyl $R^{7a}$ can especially be benzoyl.

$C_2$–$C_{10}$-Alkylene, $C_6$–$C_{15}$-arylene or $C_6$–$C_{12}$-cycloalkylene D is as defined under (b).

The following compounds are examples of piperidine compounds from this class:

(47) 3-benzyl-1,3,8-triaza-7,7,9,9-tetramethylspiro[4.5]-decane-2,4-dione
(48) 3-n-octyl-1,3,8-triaza-7,7,9,9-tetramethylspiro[4.5]-decane-2,4-dione
(49) 3-allyl-1,3,8-triaza-1,7,7,9,9-pentamethylspiro[4.5]decane-2,4-dione

(50) 3-glycidyl-1,3,8-triaza-7,7,8,9,9-pentamethyl-spiro[4.5]decane-2,4-dione
(51) 2-iso-propyl-7,7,9,9-tetramethyl-1-oxa-3,8-diaza-4-oxo-spiro[4.5]decane
(52) 2,2-dibutyl-7,7,9,9-tetramethyl-1-oxa-3,8-diaza-4-oxo-spiro[4.5]decane
(53) 2,2,4,4-tetramethyl-7-oxa-3,20-diaza-21-oxo-dispiro[5.1.11.2]heneicosane
(54) 2-butyl-7,7,9,9-tetramethyl-1-oxa-4,8-diaza-3-oxo-spiro[4.5]decane or the compounds of the following formulae:

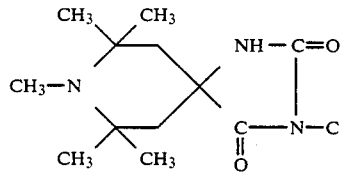
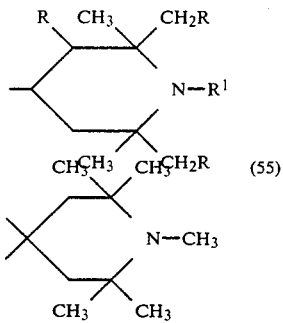
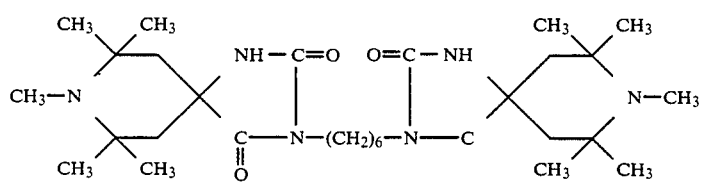

(55)

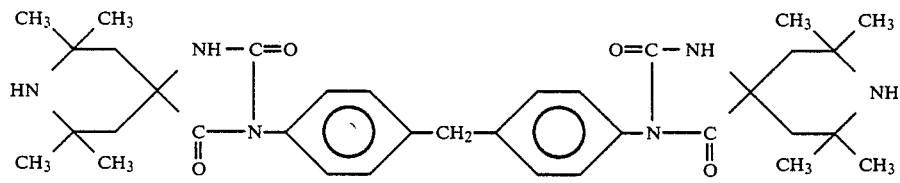

(56)

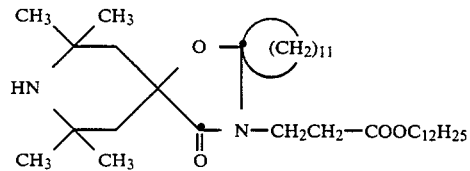

(57)

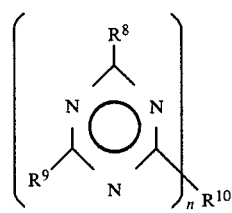

(57a)

$-N(CH_2OR^{13})_2$, $R^{10}$ is, if $n=1$, identical to $R^8$ or $R^9$ and, if $n=2$, is a group $-E-B-E-$, in which B is $C_2-C_6$-alkylene which may be interrupted by $-N(R^{11})-$, $R^{11}$ is $C_1-C_{12}$-alkyl, cyclohexyl, benzyl or $C_1-C_4$-hydroxyalkyl or a group of the formula (e) Compounds of the formula VI

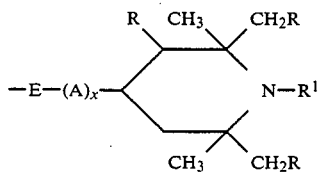

(VI)

in which n is the number 1 or 2 and $R^8$ is a group of the formula

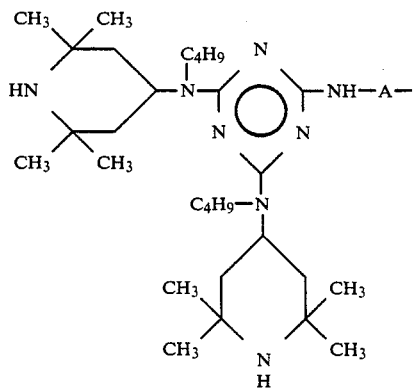

in which R and $R^1$ are as defined under (a), E is $-O-$ or $-NR^{11}-$, A is $C_2-C_6$-alkylene or $-(CH_2)_3-O-$ and x is the number 0 or 1, $R^9$ is identical to $R^8$ or is one of the groups $-NR^{11}R^{12}$, $-OR^{13}$, $-NHCH_2OR^{13}$ or $R^{12}$ is $C_1-C_{12}$-alkyl, cyclohexyl, benzyl or $C_1-C_4$-hydroxyalkyl and $R^{13}$ is hydrogen, $C_1-C_{12}$-alkyl or phenyl, or $R^{11}$ and $R^{12}$ together are $C_4-C_5$-alkylene or -oxa-alkylene or $R^{11}$ and $R^{12}$ are each a group of the formula Any $C_1$–$C_{12}$-alkyl substituents are, for example, methyl, ethyl, n-propyl, n-butyl, sec.-butyl, tert.-butyl, n-hexyl, n-octyl, 2-ethylhexyl, n-nonyl, n-decyl, n-undecyl or n-dodecyl.

Any $C_1$–$C_4$-hydroxyalkyl substituents are, for example, 2-hydroxyethyl, 2-hydroxypropyl, 3-hydroxypropyl, 2-hydroxybutyl or 4-hydroxybutyl.

$C_2$–$C_6$-Alkylene A is, for example, ethylene, propylene, 2,2-dimethylpropylene, tetramethylene or hexamethylene.

If $R^{11}$ and $R^{12}$ together are $C_4$–$C_5$-alkylene or -oxaalkylene, this is, for example, tetramethylene, pentamethylene or 3-oxapentamethylene.

The compounds of the following formulae are examples of piperidine compounds from this class:

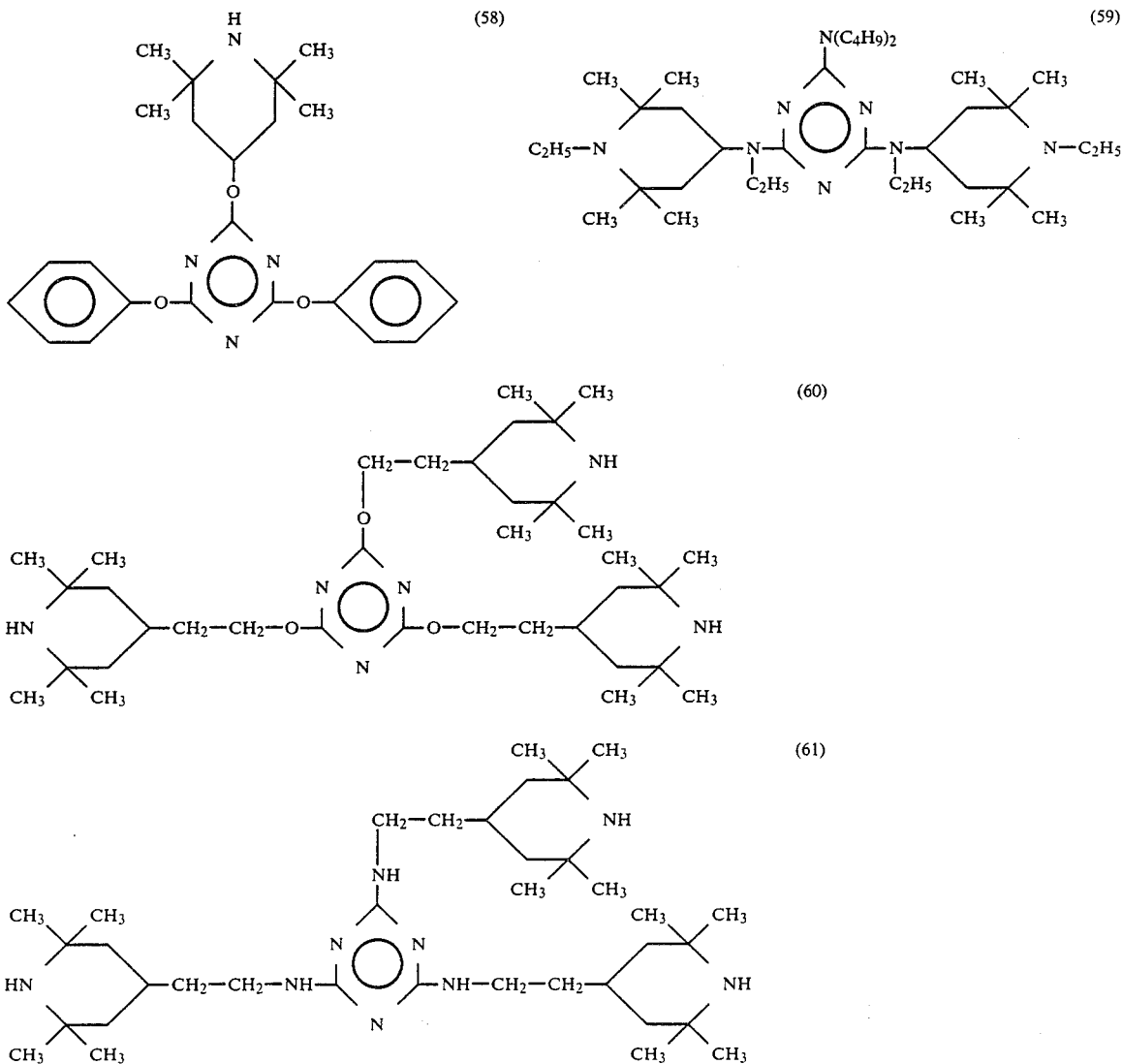

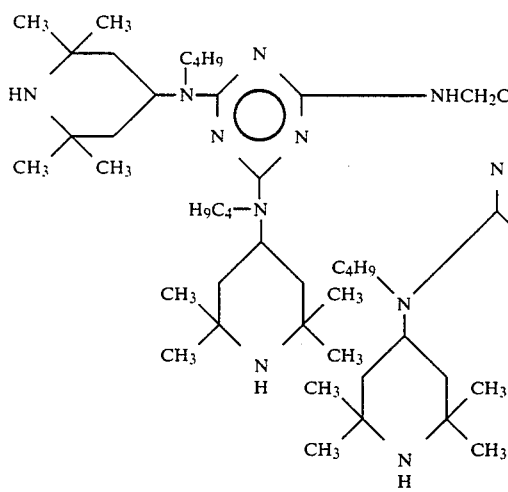
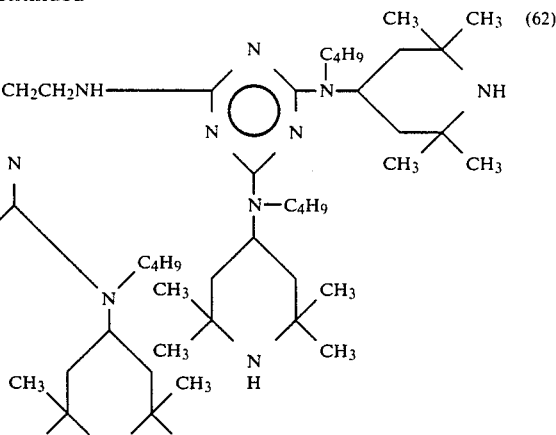
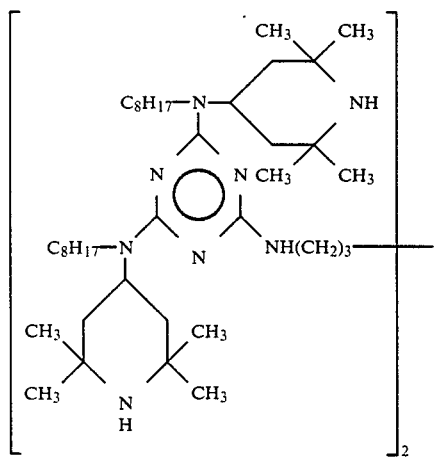
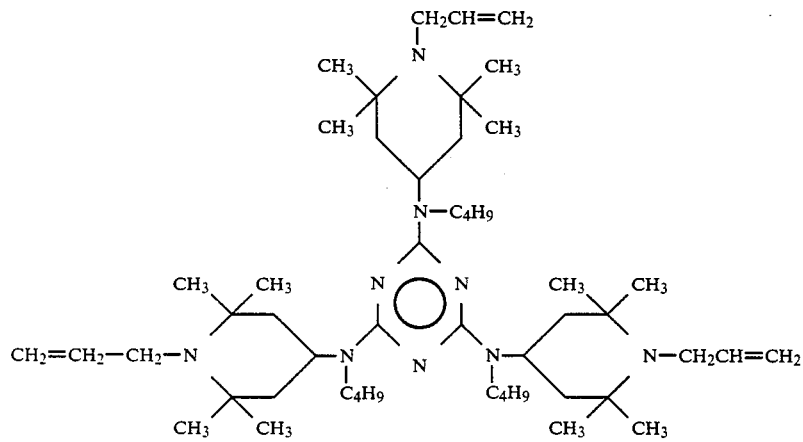
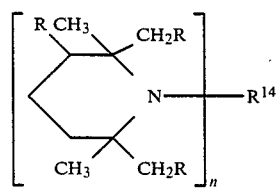
(f) Compounds of the formula VII in which n is the number 1 or 2, R is as defined for formula I and $R^{14}$, if n=1, is $C_4$-$C_{18}$-alkyl, $C_7$-$C_{12}$-aralkyl, the group —CO—$R^{15}$, $C_1$-$C_4$-alkyl substituted by —CN, —COO$R^{16}$, —OH or —OCO$R^{17}$, or is

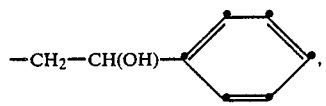

$R^{15}$ being $C_1$-$C_{12}$-alkyl, $C_2$-$C_4$-alkenyl or phenyl, $R^{16}$ being $C_1$-$C_{18}$-alkyl, $R^{17}$ being $C_1$-$C_{18}$-alkyl, $C_2$-$C_{10}$-alkenyl, cyclohexyl, benzyl or $C_6$-$C_{10}$-aryl, and, if n=2, $R^{14}$ is $C_4$-$C_{12}$-alkylene, but-2-en-1,4-ylene, xylylene, the group —(CH$_2$)$_2$—OOC—$R^{18}$—COO—(CH$_2$)$_2$— or the group —CH$_2$—OOC—$R^{19}$—COO—CH$_2$—, $R^{18}$ being $C_2$-$C_{10}$-alkylene, phenylene or cyclohexylene and $R^{19}$ being $C_2$-$C_{10}$-alkylene, xylylene or cyclohexylene.

Any $C_1$-$C_{12}$-alkyl substituents are, for example, methyl, ethyl, n-propyl, n-butyl, sec.-butyl, tert.-butyl, n-hexyl, n-octyl, 2-ethylhexyl, n-nonyl, n-decyl, n-undecyl or n-dodecyl.

Any $C_1$-$C_{18}$-alkyl substituents can, for example, be the groups listed above and in addition also, for example, n-tridecyl, n-tetradecyl, n-hexadecyl or n-octadecyl.

Any $C_2$-$C_{10}$-alkylene groups are, for example, ethylene, propylene, 2,2-dimethylpropylene, tetramethylene, hexamethylene, octamethylene or decamethylene.

$C_4$-$C_{18}$-Alkyl $R^{14}$ is, for example, n-butyl, sec.-butyl, tert.-butyl, n-hexyl, n-octyl, 2-ethylhexyl, 1,1-dimethyl-2-tert.-butylethyl, n-nonyl, n-decyl, n-dodecyl, n-tridecyl, n-tetradecyl, n-hexadecyl or n-octadecyl.

—CN-Substituted $C_1$-$C_4$-alkyl $R^{14}$ is, for example, cyanomethyl, cyanoethyl, 3-cyano-n-propyl or 4-cyano-n-butyl.

$C_4$-$C_{12}$-Alkylene $R^{14}$ is, for example, 2,2-dimethylpropylene, tetramethylene, hexamethylene, octamethylene, decamethylene or dodecamethylene.

$C_7$-$C_{12}$-Aralkyl $R^{14}$ is in particular phenethyl, p-methylbenzyl or especially benzyl.

$C_2$-$C_4$-Alkenyl $R^{15}$ is, for example, vinyl, prop-1-enyl, allyl, methallyl or but-2-enyl.

$C_2$-$C_{10}$-Alkenyl $R^{17}$ is, for example, one of the groups as defined for alkenyl $R^{15}$ and additionally also, for example, crotyl, hex-2-enyl, oct-2-enyl or dec-2-enyl. $C_6$-$C_{10}$-Aryl $R^{17}$ is, for example, phenyl which is unsubstituted or substituted in the o-position or p-position by methyl, ethyl, isopropyl, n-butyl or tert.-butyl.

The following compounds are examples of piperidine compounds from this class:
(65) bis-[β-2,2,6,6-tetramethylpiperidino)-ethyl]sebacate
(66) n-octyl α-(2,2,6,6-tetramethyl-piperidino)-acetate
(67) 1,4-bis-(2,2,6,6-tetramethylpiperidino)-but-2-ene.

(g) Compounds of the formula VIII

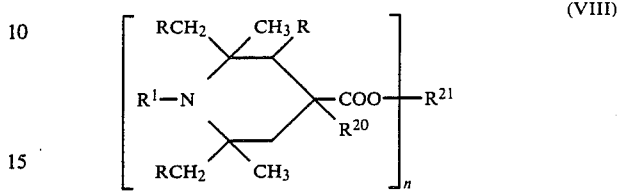

(VIII)

in which n is a number from 1 to 4, preferably 1 or 2, R and $R^1$ are as defined under (a), $R^{20}$ is hydrogen, hydroxyl or $C_1$-$C_8$-alkoxy and $R^{21}$, if n=1, is $C_1$-$C_{20}$-alkyl, $C_3$-$C_{14}$-alkoxyalkyl, $C_5$-$C_{12}$-cycloalkyl or $C_7$-$C_{14}$-aralkyl and, if n=2, is $C_2$-$C_{12}$-alkylene, $C_4$-$C_9$-alkylene which is interrupted by one or two —O—, $C_6$-$C_{12}$-cycloalkylene, $C_8$-$C_{16}$-cycloalkylene-dialkylene or $C_8$-$C_{14}$-aralkylene and, if n=3, is $C_3$-$C_{12}$-alkanetriyl and, if n=4, is $C_4$-$C_{12}$-alkanetetrayl.

Examples of monovalent radicals R21 are ethyl, 2-ethylbutyl, n-octyl, n-dodecyl, n-octadecyl, 2-isopropoxyethyl, 2-dodecyloxyethyl, 2-butoxypropyl, cyclohexyl, cyclooctyl, benzyl or 2-phenylethyl. Examples of divalent radicals $R^{21}$ are 1,2-ethylene, tetramethylene, hexamethylene, octamethylene, dodecamethylene, 3-oxa-pentamethylene, 3,6-dioxaoctamethylene, 1,4-cyclohexylene, 1,5-cyclooctylene, 1,4-cyclohexylene-dimethylene, 1,4-cyclohexylene-diethylene and m- or p-xylylene. Examples of trivalent radicals $R^{21}$ are propane-1,2,3-triyl, 1,1,1-trimethyleneethane or 1,1,1-trimethylenepropane. Examples of tetravlent radicals $R^{21}$ are butane-1,2,3,4-tetrayl or tetramethylenemethane.

(h) Polymeric compounds, the recurring structural unit of which contains a tetraalkylpiperidine radical of the formula I, in particular polyesters, polyethers, polyamides, polyamines, polyurethanes, polyureas, polyaminotriazines, poly(meth)acrylates, poly(meth)acrylamides and copolymers thereof, which contain such radicals.

The compounds of the following formulae are examples of piperidine compounds from this class, m being one of the numbers from 2 to about 200.

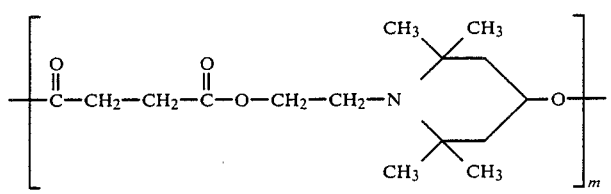

(68)

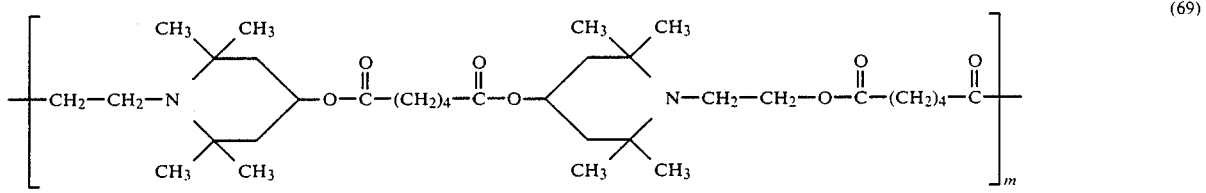

(69)

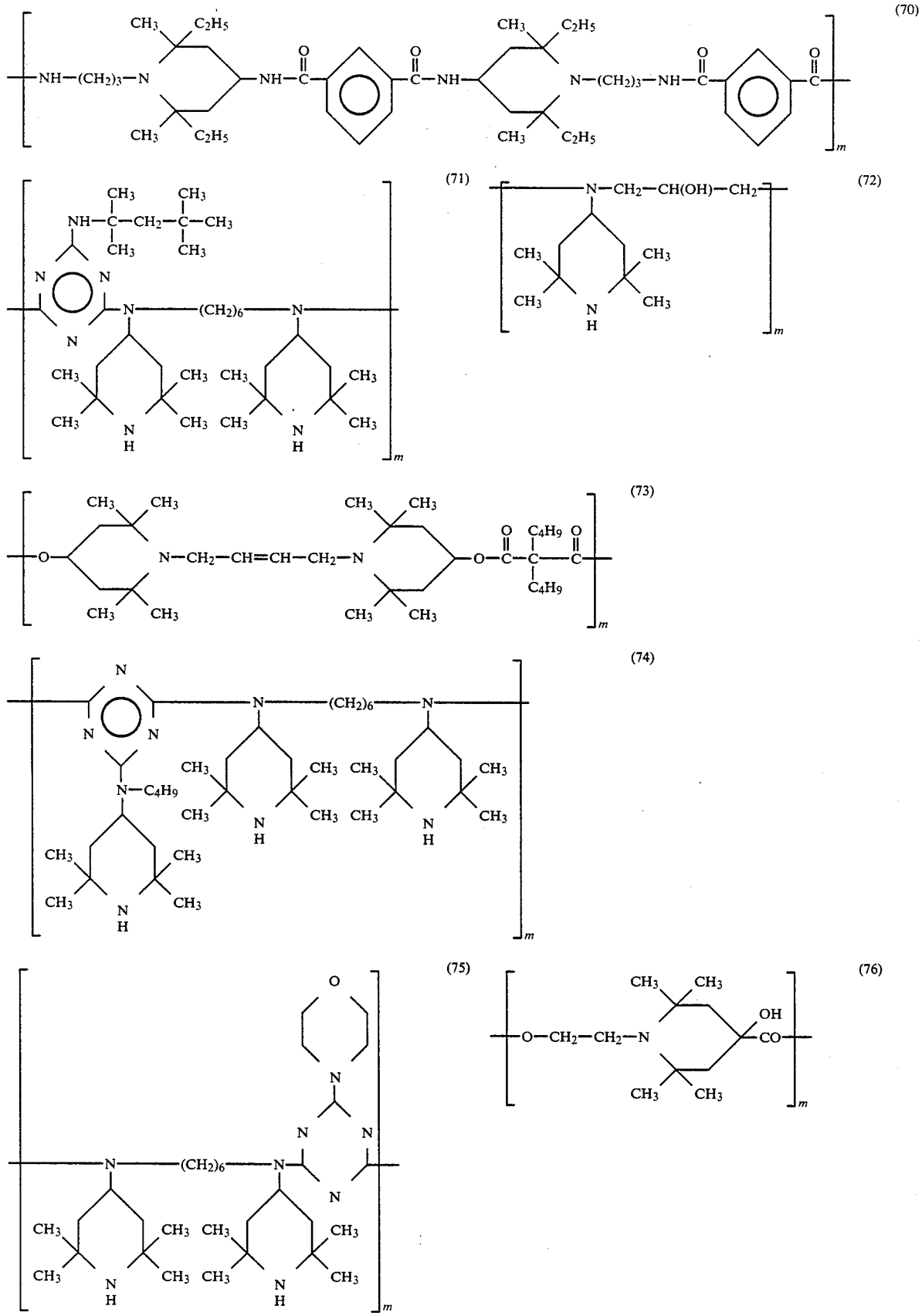

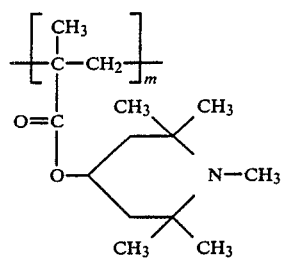
(77)

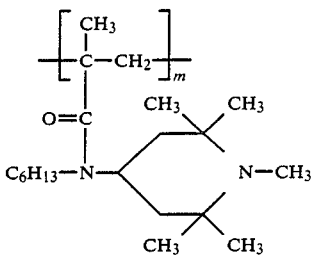
(78)

(i) Compounds which, in their molecule, contain at least one 2-(2'-hydroxyphenyl)-benzotriazole group or 2-hydroxybenzophenone group and at least one tetraalkylpiperidine group.

The compounds of the following formulae are examples of piperidine compounds from this class:

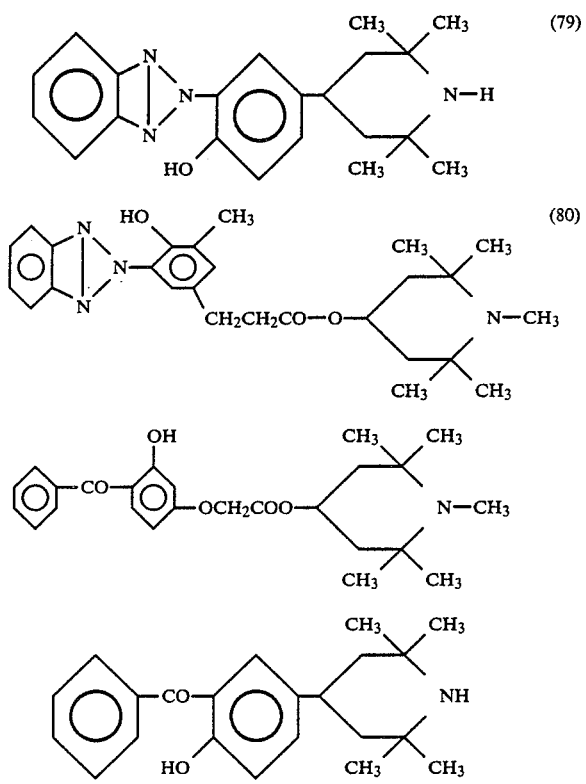

To the extent that the tetraalkylpiperidine compounds are basic compounds, they can form salts with acids. Examples of such acids are inorganic acids or organic carboxylic, sulfonic, phosphonic or phosphinic acids, for example hydrochloric acid, boric acid, phosphoric acid, acetic acid, salicylic acid, toluenesulfonic acid or benzenephosphonic acid.

To the extent that the tetraalkylpiperidine compounds are basic compounds, they can form complexes with metal chelates, which complexes can also be used for purposes of the invention. The metal chelates can, for example, be those of zinc, cadmium, cobalt, aluminium or chromium, and those of nickel are particularly preferred. Examples of suitable chelate formers are 1,3-dicarbonyl compounds or 2-acylphenols, for example ethyl acetoacetate, acetylacetone, benzoylacetone, o-hydroxyacetophenone or o-hydroxybenzophenone. Complexes having a piperidine: metal chelate ratio 1:1 and 2:1 are preferred. The polymeric piperidine derivatives of class (h) can also form such complexes with metal chelates, which can be used according to the invention.

For certain fields of application, it can be desirable that the curing accelerator copolymerises with the ethylenically unsaturated compounds. For this purpose, those sterically hindered amines are selected which possess ethylenically unsaturated groups, for example allyl, vinyl or maleate groups, and in particular acrylic or methacrylic groups. Examples of such compounds are the compounds 2, 7, 9, 17 and 49, listed above, and the following compounds:

(83) 1,2,2,6,6-pentamethyl-4-acryloyloxy-piperidine
(84) 1-acetyl-2,2,6,6-tetramethyl-4-acryloyloxy-piperidine
(85) 1-benzyl-2,2,6,6-tetramethyl-4-acryloxyloxy-piperidine
(86) 1,2,2,6,6-pentamethyl-4 methacrylamido-piperidine
(87) 1,2,2,6,6-pentamethyl-4-(N-butyl)-acrylamido-piperidine
(88) 1,2,2,6,6-pentamethyl-4-maleimido-piperidine
(89) 1,3,8-triaza-2,4-dioxo-3-acryloyloxyethyl-7,7,8,9,9-pentamethylspiro[4.5]decane
(90) 1-[(2-methacryloyloxy)-ethyl]-2,2,6,6-tetramethyl-piperidine.

The advantage of the accelerators copolymerised in this way is that they cannot be lost from the cured coating by migration or extraction and can therefore act as light stabilisers for a long period.

In special cases, it can be an advantage to use a mixture of sterically hindered amines. The total of added curing accelerator is 0.1 to 20% by weight, preferably 0.5 to 10% by weight, relative to the total of the unsaturated curable compounds.

The accelerator is added to the coating compositions in a simple manner by dissolving it in one of the monomeric components or in the mixture. These solutions are stable, since the accelerators are not polymerisation initiators. However, the mixtures can also contain inhibitors, such as are known for ethylenically unsaturated compounds, for example hydroquinone and derivatives thereof, β-naphthols, copper compounds, phenothiazine derivatives or hydroxylamine derivatives.

Due to their light-stabilisation activity, the accelerators according to the invention, of the sterically hindered amine type, effect a stabilisation of the coating compositions against light-induced damage. This light-stabilisation effect can be considerably enhanced if a light stabiliser from the UV absorber class is also added to the coating compositions. The following classes of compounds are examples of known UV absorbers:

1. 2-(2'-Hydroxyphenyl)-benzotriazoles, for example the 5'-methyl, 3',5'-di-tert.-butyl, 5'-tert.-butyl, 5'-

(1,1,1,3,3-tetramethylbutyl), 5-chloro-3',5'-di-tert.-butyl, 5-chloro-3'-tert.-butyl-5'-methyl, 3'-sec.-butyl-5'-tert.-butyl, 3'-α-methylbenzyl-5'-methyl, 3'-α-methylbenzyl-5'-methyl-5-chloro, 4'-hydroxy, 4'-methoxy, 4'-octyloxy, 3',5'-di-tert.-amyl, 3'-methyl-5'-carbomethoxyethyl, 3',5'-bis-(α,α-dimethylbenzyl), 3',5'-bis-(α,α-dimethylbenzyl)-5-chloro, 3',5'-di-tert.-octyl, 3',5'-di-tert.-octyl-5-chloro and 5-chloro-3',5'-di-tert.-amyl derivatives. The 1,2,3-triazoles described in U.S. Pat. No. 3,642,813 can also be used.

2. 2,4-Bis-(2'-hydroxyphenyl)-6-alkyl-s-triazines, for example the 6-ethyl, 6-heptadecyl and 6-undecyl derivatives.

3. 2-Hydroxybenzophenones, for example the 4-hydroxy, 4-methoxy, 4-octoxy, 4-decyloxy, 4-dodecyloxy, 4-benzyloxy, 4,2',4'-trihydroxy or 2'-hydroxy-4,4'-dimethoxy derivatives.

4. 1,3-(2'-Hydroxybenzoyl)-benzenes, for example 1,3-bis-(2'-hydroxy-4'-hexyloxy-benzoyl)-benzene, 1,3-bis-(2'-hydroxy-4'-octyloxy-benzoyl)-benzene and 1,3-bis-(2'-hydroxy-4'-dodecyloxy-benzoyl)-benzene.

5. Esters of substituted or unsubstituted benzoic acids, for example 4-tert.-butyl-phenyl salicylate, phenyl salicylate, octylphenyl salicylate, dibenzoylresorcinol, bis-(4-tert.-butylbenzoyl)-resorcinol, benzoylresorcinol and 2,4-di-tert.-butyl-phenyl 3,5-di-tert.-butyl-4-hydroxybenzoate.

6. Acrylates, for example ethyl or isooctyl α-cyano-β,β-diphenylacrylate, methyl α-carbomethoxy-cinnamate, methyl α-cyano-β-methoxy-p-methoxy-cinnamate and N-(β-carbomethoxy-β-cyanovinyl)-2-methylindoline.

7. Oxalic acid diamides, for example 4,4'-di-octyloxy-oxanilide, 2,2'-di-octyloxy-5,5'-di-tert.-butyl-oxanilide, 2,2'-didodecyloxy-5,5'-di-tert.-butyl-oxanilide, 2-ethoxy-2'-ethyloxanilide, N,N'-bis-(3-dimethylaminopropyl)-oxalamide, 2-ethoxy-5-tert.-butyl-2'-ethyl-oxanilide, 2-ethoxy-2'-ethyl-5,4'-di-tert.-butyl-oxanilide and mixtures of ortho- and para-methoxy and o- and p-ethoxy-disubstituted oxanilides.

Amongst the UV absorbers used according to the invention, those of classes 1, 3 and 7 are preferred, and in particular those of class 1 (benzotriazoles). Such benzotriazoles are described, for example, in U.S. Pat. Nos. 3,004,896, 3,189,615, 3,320,194, 4,127,586 and 4,283,327. The UV absorbers are added in a quantity of 0.1 to 5% by weight, preferably 0.5 to 2% by weight, relative to the total of the radiation-curable compounds.

In a preferred embodiment of the invention, an organic compound of trivalent phosphorus is added to the radiation-curable mixtures. Examples of these are phosphites, phosphonites and phosphines. Such compounds are known as costabilisers for polymers. Examples of phosphites are trialkyl, triaryl and alkylated triaryl phosphites as well as mixed phosphites, such as trilauryl, triphenyl, phenyl di(decyl), tris-(nonylphenyl) and tris-(2,4-di-tert.-butylphenyl)phosphites or pentaerythritol bis-(octadecyl phosphite). Examples of phosphonites are tetra-(2,4-di-tert.-butylphenyl)diphenyl-4,4'-diphosphonite and di-(2,4-di-tert.-butylphenyl)phenyl-phosphonite. Examples of phosphines are especially tertiary phosphines, for example triphenylphosphine, tritolylphosphine or trilaurylphosphine. Preferably, phosphites are used.

These phosphorus compounds effect a stabilisation of the cured coating to discolouration, in particular in the presence of UV absorbers, and to thermal-oxidative ageing. The quantity of the phosphorus compounds added is in general 0.1 to 5% by weight, relative to the total of the radiation-curable compounds.

The radiation-curable mixtures can contain further stabilisers, such as are conventional in coating technology. Examples of these are antioxidants and metal deactivators.

The radiation-curable coatings can be applied to the most diverse substrates, for example to wood, metal, plastic, paper, glass or ceramic masses. The application can be carried out continuously or discontinuously by the conventional methods of the technology, for example by brushing, spraying, dipping or by electrostatic processes. Application in several layers is also possible.

Curing is effected by irradiation with electron beams, for which purpose the conventional types of equipment for the radiation curing of coatings are suitable. These operate predominantly in a continuous process, the object to be coated being transported through an irradiation chamber. At voltages of 100 to 400 KV and at about 10 to 100 mA, curing of the coatings takes place in less than one second. Preferably, the irradiation is carried out in an inert gas atmosphere.

In a variant of the curing process according to the invention, the coating composition is first pre-cured by electron irradiation and then finally cured by irradiation with UV light. In this case, a photoinitiator, such as is known for the UV curing of ethylenically unsaturated systems, is advantageously added to the composition to be cured. Examples of such photoinitiators are benzophenone and its derivatives, acetophenone derivatives and other aromatic-aliphatic ketones, benzoin and benzoin ethers, benzil and benzil ketals or acylphosphine oxides.

Such a two-stage process can be of advantage in special cases, for example if particularly rapid curing on the surface is important or if the electron irradiation is not carried out under an inert gas.

The fields of application of electron beam curing are wide-ranging, for example the coating of furniture, of vehicle components or of machine components, coil coating, the coating of packaging material, in particular films, wire enamelling, the application of insulating layers for printed circuits or other electronic components, or the application of adhesives to films or other substrates.

The examples which follow illustrate the invention in more detail. In the examples, parts are parts by weight and % are percent by weight.

EXAMPLE 1

A mixture of 85 parts of Ebecryl ®584 (solution of a polyester acrylate in hexanediol diacrylate, manufacturer: UCB Belgium)

15 parts of thinner QM 672 (dicyclopentadienyloxyethyl acrylate, manufacturer: Rohm & Haas Co., USA)

6.3 parts of Byk 300 (flow assistant based on a polysiloxane, manufacturer: Byk-Mallinckrodt, Federal Republic of Germany) and 1 part of the curing accelerator listed in Table 1, are homogenised in a high-speed stirrer.

The clear mixture is applied by means of an applicator coil in a layer thickness of 40 μm to steel sheet coated beforehand with a primer and a metal-effect finish.

These samples are subjected in an electro-curtain apparatus from Messrs. Charmilles, Geneva, to electron beam curing in an inert gas atmosphere (N$_2$). The radiation dose is 6 megarad. 24 hours after the irradiation, the Koenig pendulum hardness (DIN 53,157) is measured, which is a criterion of the degree of curing reached.

TABLE 1

| Added curing accelerator (1% relative to finish resin) | Pendulum hardness (seconds) |
|---|---|
| none | 129 |
| Di-(1,2,2,6,6-pentamethyl-piperidin-4-yl) sebacate | 152 |
| Di-(1-allyl-2,2,6,6-tetra-methyl-piperidin-4-yl) sebacate | 150 |
| 2,4,6-Tris-(N—butyl-1-allyl-2,2,6,6-tetramethylpiperidin-4-yl-amino)-1,3,5-triazine (compound No. 64) | 151 |

This shows that the sterically hindered piperidine light stabilisers accelerate the curing.

EXAMPLE 2

The procedure is as in Example 1. The following compounds are used as the additives according to the invention:
B I: di-(1,2,2,6,6-pentamethylpiperidin-4-yl)sebacate
B II: 1,2,2,6,6-pentamethylpiperidin-4-yl)acrylate
UV I: UV absorber of the formula

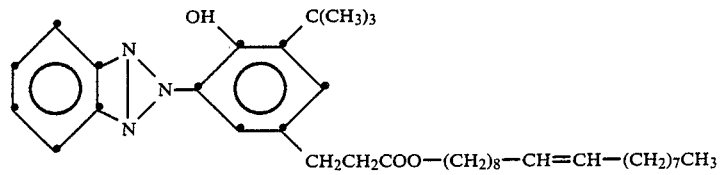

P I: trilauryl phosphite

The samples are electron beam-cured, as described in Example 1, with an irradiation dose of 6 megarad. The Koenig pendulum hardness of the cured samples is determined. The cured samples are also subjected for 300 hours to accelerated weathering in the QUV apparatus, and the gloss retention and crack formation are then determined. The results are given in Table 2.

TABLE 2

| Accelerator | UV absorber | Phosphorus compound | Pendulum hardness (seconds) | Gloss retention (%) | Crack formation |
|---|---|---|---|---|---|
| — | — | — | 129 | 26 | extensive |
| 1.0% B I | — | — | 152 | 25 | extensive |
| — | 1.5% UV I | — | 88 | 72 | none |
| — | — | 0.5% P I | 105 | 20 | extensive |
| 1.0% B I | 1.5% UV I | — | 120 | 80 | none |
| — | 1.5% UV I | 0.5% P I | 40 | 75 | none |
| 1.0% B I | 1.5% UV I | 0.5% P I | 120 | 78 | none |
| 1.0% B II | 1.5% UV I | — | 141 | 75 | none |

This shows that both the UV absorber and the phosphorus compound delay curing, whilst the piperidine light stabilisers accelerate curing. On the other hand, the UV absorber leads to a substantial improvement in the weathering resistance. When all three components are combined, the best weathering resistance is obtained, without having to accept a delay in curing.

EXAMPLE 3

This example demonstrates the accelerating effect of a hindered amine in the presence of various UV absorbers. A mixture of the following composition was used:
39.7 parts of a polyester acrylate (Ebecryl®810, Messrs. UCB)
29 parts of a polyurethane acrylate (Actylan®AJ 20, SNPE, France)
15 parts of hexanediol diacrylate
9 parts of dicyclopentenyloxyethyl acrylate (QM 672, Messrs. Rohm and Haas, USA)
4.5 parts of trimethylolpropane triacrylate
2.5 parts of 2-ethylhexyl acrylate and
0.3 part of a flow assistant (Byk®300, Messrs. Byk-Mallinckrodt, Federal Republic of Germany)

The following additives were added to this mixture, in the quantity indicated in Table 3:
B I: di-(1,2,2,6,6-pentamethylpiperidin-4-yl)sebacate
UV II: 2-[2-hydroxy-3,5-di-(tert.-amyl)-phenyl]-benzotriazole
UV III: 2-ethoxy-4'-dodecyl-oxaldianilide
UV IV: 2-hydroxy-4-(2-acryloyloxyethoxy)-benzophenone
P II: tris-(2,4-di-tert.-butyl-phenyl)phosphite.

The samples are prepared as described in Example 1 and irradiated with a radiation dose of 5 megarad. The pendulum hardnesses (DIN 53,157) thus obtained for the coating film are indicated in Table 3:

TABLE 3

| UV absorber | Phosphite | Accelerator | Pendulum hardness (seconds) |
|---|---|---|---|
| 3% of UV II | — | — | 45 |
| 2% of UV II | — | 1% of B I | 53 |
| 3% of UV II | 0.5% of P II | — | 39 |
| 2% of UV II | 0.5% of P II | 1% of B I | 56 |
| 3% of UV III | — | — | 52 |
| 2% of UV III | — | 1% of B I | 70 |
| 3% of UV IV | — | — | 56 |
| 2% of UV IV | — | 1% of B I | 69 |

EXAMPLE 4

The procedure is as in Example 1, but a mixture of the following composition is used:
75.2 parts of a polyether acrylate (Plex®6631, Messrs. Röhm GmbH, Federal Republic of Germany)
24.0 parts of hexanediol diacrylate
0.5 part of a flow assistant based on silicones (Byk®300, Messrs. Byk-Mallinckrodt, Federal Republic of Germany)
0.3 part of a flow assistant based on silicones (Blisterfree®, Messrs. B. Schwegmann, Federal Republic of Germany)

The curing accelerator used is di-1,2,2,6,6-pentamethylpiperidin-4-yl sebacate (=B I) in quantities of 1% and 2%, relative to the finish of the above composition. The samples are irradiated with a radiation dose of 4 and 5 megarad. The results are listed in Table 4:

TABLE 4

| Curing accelerator | Pendulum hardness according to DIN 53,157 (seconds) Radiation dose | |
| --- | --- | --- |
| | 4 Mrad | 5 Mrad |
| none | 60 | 88 |
| 1% of B I | 92 | 103 |
| 3% of B I | 100 | 128 |

EXAMPLE 5

The procedure is as in Example 4, but a mixture of the following composition is used:
67.2 parts of a polyether acrylate (Plex ®6673, Messrs. Röhm GmbH)
32.0 parts of hexanediol diacrylate
0.5 part of a flow assistant based on silicones (Byk ®300, Messrs. Byk-Mallinckrodt, Federal Republic of Germany)
0.3 part of a flow assistant (Blisterfree ®, Messrs. B. Schwegmann, Federal Republic of Germany)

TABLE 5

| Curing accelerator | Pendulum hardness (seconds) at radiation dose of | |
| --- | --- | --- |
| | 10 Mrad | 20 Mrad |
| none | 39 | 73 |
| 1% of B I | 66 | 112 |
| 3% of B I | 102 | 127 |

EXAMPLE 6

The procedure is as in Example 4, using the following mixture:
65.2 parts of an epoxide acrylate (Setalux ®UV 2280, Messrs. Synthese B. V., Holland)
34.0 parts of hexanediol diacrylate
0.5 part of Byk ®300 flow assistant
0.3 part of Blisterfree ® flow assistant

TABLE 6

| Accelerator | Pendulum hardness (seconds) at radiation dode of | |
| --- | --- | --- |
| | 1 Mrad | 1.5 Mrad |
| none | 65 | 81 |
| 1% of B I | 83 | 83 |
| 3% of B I | 87 | 106 |

EXAMPLE 7

The procedure is as in Example 4, using the following mixture:
39.2 parts of a polyacrylate resin (Ebecryl ®754, Messrs. UCB, Belgium)
56.0 parts of hexanediol diacrylate
0.5 part of Byk ®300 flow assistant
0.3 part of Blisterfree ® flow assistant

TABLE 7

| Accelerator | Pendulum hardness (seconds) at radiation dose of | |
| --- | --- | --- |
| | 5 Mrad | 7.5 Mrad |
| none | 57 | 72 |
| 1% of B I | 60 | 76 |
| 3% of B I | 84 | 83 |

EXAMPLE 8

The procedure is as in Example 4, using the following mixture:
49.2 parts of a polyurethane acrylate (Actylan ®AJ, 18 Messrs. SNPE, France)
40.0 parts of hexanediol diacrylate
10.0 parts of N-vinylpyrrolidone
0.5 part of Byk ®300 flow assistant
0.3 part of Blisterfree ® flow assistant

TABLE 8

| Accelerator | Pendulum hardness (seconds) at radiation dose of | |
| --- | --- | --- |
| | 0.75 Mrad | 1 Mrad |
| none | 65 | 85 |
| 1% of B I | 90 | 92 |
| 3% of B I | 98 | 108 |

What is claimed is:

1. A process for curing coating compositions, which contain ethylenically unsaturated compounds, by electron beam irradiation with the addition of a curing accelerator, which comprises using as the curing accelerator at least one 2,2,6,6-tetraalkylpiperidine derivative which, in its molecule, contains at least one group of the formula I $$\begin{array}{c} RCH_2 \quad CH_3 \; R \\ -N \\ RCH_2 \quad CH_3 \end{array} \quad (I)$$

in which R is hydrogen or methyl.

2. A process according to claim 1, wherein the curing accelerator used is a piperidine derivative which, in its molecule, contains at least one group of the formula I, in which R is hydrogen and there is no hydrogen on the ring nitrogen.

3. A process according to claim 1, wherein the curable coating composition contains a light stabiliser from the class of UV absorbers, preferably a light stabiliser from the class of 2-(2'-hydroxyphenyl)-benzotriazoles.

4. A process according to claim 1, wherein the curable coating composition contains an organic compound of trivalent phosphorus, preferably an organic phosphite.

5. A process according to claim 1, wherein the curable coating composition is an automotive finish or a coil coating finish or a film finish or a wire enamel.

6. A process according to claim 1, wherein the coating composition is a constituent of a multi-coat finish.

7. A process according to claim 1, which is followed by an irradiation with UV light and wherein a photoinitiator is added to the coating composition.

8. A process according to claim 1 for curing coating compositions which do not contain any N-vinylpyrrolidone.

* * * * *